Oct. 16, 1934.  V. HARMS  1,976,936
METHOD OF CRYSTALLIZATION
Filed Nov. 24, 1930
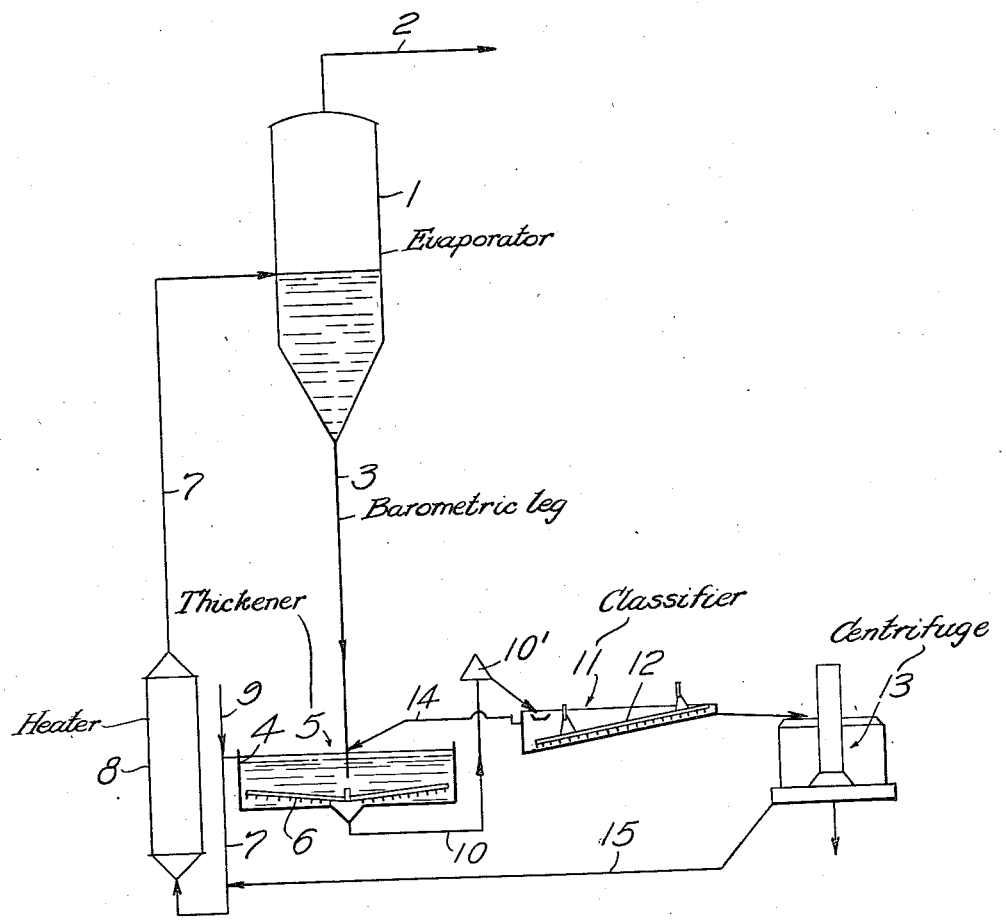
INVENTOR
VIGGO HARMS
BY  *Arthur Middleton*
ATTORNEY Patented Oct. 16, 1934

1,976,936

UNITED STATES PATENT OFFICE 1,976,936

METHOD OF CRYSTALLIZATION

Viggo Harms, Berlin, Germany, assignor, by mesne assignments, to The Dorr Company, Inc., New York, N. Y., a corporation of Delaware Application November 24, 1930, Serial No. 497,780
In Germany May 10, 1930

1 Claim. (Cl. 23—273)

This invention relates to the removal of crystals from evaporated solutions.

Heretofore the removal of crystals from evaporated solutions has been effected by use of a salt trap which involves intermittent or discontinuous removal of the crystals and requires much supervision; and also by a continuous operation in which the crystals irrespective of size are allowed to thicken in a settling tank, such as a cone, and are drawn from the cone and delivered to a centrifuge.

In the continuous method just referred to, the slurry removed from the cone contains such an excess of liquor to facilitate pumping that a considerable load is put on the centrifuge; and also the crystallized material in such slurry is in the form of a mixture of large and small crystals which frequently results in trouble in the centrifuge and in the formation of considerable dust upon completion of the drying operation.

An important object of the present invention is to provide an improved process whereby such difficulties and disadvantages will be avoided. Another important object of the invention is to provide apparatus for carrying out the process.

According to the present invention a more nearly uniform crystalline product can be obtained, the size of the crystals in the product can be controlled, and the ultimate crystal slurry to be dried is relatively thick and uniform, thus making it easier to obtain a drier cake than has heretofore been obtained. Furthermore as to crystals separated from evaporated solutions of various materials, the trade demands a product composed of crystals of relatively large size. Such a product has various advantages, for example, it may be easier to obtain more uniform quality and to detect adulteration.

Other objects and advantages will be apparent upon consideration of the following description and of the accompanying drawing, in which:

The figure is a diagrammatic showing of a preferred form of apparatus for carrying out the invention.

The objects of the invention may in general be attained by supplying the liquor from an evaporator to a settling apparatus acting as a hydro-separator in which crystals are formed and settled and the resulting crystal slurry is partially dewatered and from which the overflow is reheated and returned to the evaporator and the settled crystals with some liquid are transferred, as by pumping, to a classifier. From the classifier the smaller crystals are transferred with the overflow back into the hydroseparator and the larger crystals are transferred to drying means, such as a centrifuge in which they are readily dried and removed therefrom from time to time in batches.

The overflow from the settling apparatus eventually carries off the fine crystals which are dissolved in the reheating stage and returned in the resulting solution to the evaporator. Also the liquor from the centrifuge may be added to the overflow from the settling apparatus and returned with such overflow through the heater to the evaporator. New feed or fresh solution may be added to the return flow before reaching the heater.

As one example of the application of the process and apparatus of the present invention, reference is made to the separation of crystals of ammonium sulphate from an evaporated solution of that substance.

Referring to the drawing, 1 designates an evaporator which is preferably connected at its upper part with a vacuum line 2 through which vapor is withdrawn and at its lower part, which is preferably conical, with a line 3 through which the concentrated liquor passes downwardly into the receptacle or tank 4 of settling apparatus 5 preferably a thickener of the Dorr type which incliudes a rotary rake structure 6 or other continuously operable mechanical settled solids impelling conveyor. There is a continuous flow of concentrated liquor from the evaporator 1 to the tank 4 and the crystals which are formed settle to the bottom of the tank and the clearer liquid at the top (which liquid may contain crystal fines) overflows and passes through the line 7, which may be called a return line, to a heater 8 and from said heater to said evaporator 1 substantially at the normal liquid level therein. Preferably the apparatus is so arranged that liquid is supplied to the heater substantially at atmospheric pressure thus obtaining better circulation effects than would be obtained if the liquid when supplied to the heater were held back by the vacuum action in the evaporator. The process carried out in the apparatus is intended to be continuous and it is therefore necessary to add fresh solution as required, for example through the conduit or pipe 9 which connects with the pipe or line 7 so as to be added to the overflow from the tank before the overflow reaches the heater.

The settled crystals and some liquid are continuously removed from the tank 4 through a pipe line 10 by a suitable pump 10' (for example, a Dorr diaphragm pump) and fed to a classifier 11, preferably of the Dorr type. The coarser crystals are taken out as a thick mass of crystals by the classifier rake structure 12 and transferred to a centrifuge 13 while the finer crystals in liquid suspension overflow into the tank 4 as indicated by the line 14 and associated arrow head. The liquor removed from the crystals in the centrifuge 13 is returned through a pipe or line 15 for addition to the overflow from the tank 4 and to the fresh solution and return therewith through the heater 8 and the return pipe or line 7 to the evaporator 1; and the crystals in the centrifuge 13 are removed in batches.

The method of the present invention is continuous and gives a considerably thicker and more uniform crystal slurry to the centrifuge than methods heretofore in use, thus making it possible to obtain a drier centrifuge cake than before, and often so dry that the product can be marketed without further drying.

It should be understood that various changes can be made in the process and that various changes can be made in the construction and arrangement of the parts of the apparatus without departing from the true spirit and scope of the invention.

Having thus described my invention, I claim:

The process of removing crystals from a solution, which pass from an evaporator through a barometric leg to a crystal separating stage from which the solution containing the small crystals is returned to the evaporator, characterized by the fact that the separation of crystals is effected during classification of the crystals in sedimentation apparatus of the continuously operable mechanical type having a moving settled-solids impelling structure, for delivering the coarser crystals free from finer crystals through selective action of the sedimentation apparatus.

VIGGO HARMS.